United States Patent
Bai et al.

[11] Patent Number: 5,872,698
[45] Date of Patent: Feb. 16, 1999

[54] COMPOSITE MULTILAYER ELECTRODES FOR ELECTROCHEMICAL CELLS

[76] Inventors: Lijun Bai, 114 Midway La., Vernon Hills, Ill. 60061; Joseph G. Kincs, 1705 Woods Dr., No. 1008, Arlington Heights, Ill. 60004; Changming Li, 135 Royal Oak, Vernon Hills, Ill. 60061

[21] Appl. No.: 850,050

[22] Filed: May 2, 1997

Related U.S. Application Data

[62] Division of Ser. No. 586,619, Feb. 1, 1996, abandoned.

[51] Int. Cl.⁶ ................................ H01G 9/00; H01G 9/04
[52] U.S. Cl. .................... 361/503; 361/508; 361/516; 361/528; 361/532
[58] Field of Search ........................... 361/522–526, 361/528–529, 532, 535, 503, 517, 540–541, 508, 511, 516, 530

[56] References Cited

U.S. PATENT DOCUMENTS

| | | | |
|---|---|---|---|
| 3,632,498 | 1/1972 | Beer et al. | 204/290 F |
| 4,513,102 | 4/1985 | Hutchings | 502/325 |
| 5,128,000 | 7/1992 | Klotz et al. | 204/89 |
| 5,232,576 | 8/1993 | Matsumoto et al. | 205/284 |
| 5,469,325 | 11/1995 | Evans | 361/526 |
| 5,503,663 | 4/1996 | Tsou et al. | 106/1.24 |

*Primary Examiner*—Dean A. Reichard
*Assistant Examiner*—Anthony Dinkins

[57] ABSTRACT

An electrochemical cell, particularly an electrochemical capacitor device (30) includes first and second electrodes (24) and (28) having an electrolyte (26) disposed therebetween. At least one of the electrodes (24) is fabricated on a substrate (12) and includes a multilayer composite electrode active material disposed thereon. The multilayer composite electrode includes first and second layer (16) and (22), in which the ratios of electroactive materials therein is varied so as to promote good adherence to the electrode substrate as well as excellent electrochemical performance.

7 Claims, 4 Drawing Sheets

COMPOSITE MULTILAYER ELECTRODES FOR ELECTROCHEMICAL CELLS

This is a Divisional Application under §1.60 of pending U.S. patent application Ser. No. 08/586,619 filed Feb. 1, 1996 now abandoned and assigned to Motorola, Inc.

TECHNICAL FIELD

This invention relates in general to electrochemical cells, and more particularly, to electrochemical capacitor devices having multilayer composite electrodes.

BACKGROUND

Energy generation and storage has long been a subject of study and development. Of special importance is the storage of electrical energy in a compact form which can be easily charged and discharged, such as the rechargeable battery and/or electrochemical capacitor. High power, particularly high current pulse, rechargeable electrochemical charge storage devices are very important in applications requiring electrical pulses, examples of which include digital communications devices, power tools, and portable computers. In each of these devices, high electrochemical kinetic rate, long cycle life of the electrode, low electrical resistivity, and good ionic conductivity of the electrolyte are extremely important.

Many high power electrochemical capacitor devices have been disclosed using ruthenium oxide as the electrochemically active material of one or both of the electrodes in an electrochemical capacitor device. Ruthenium oxide has the advantage of providing relatively long life and high power, though it is difficult to fabricate, and relatively expensive as compared to other capacitor materials. Thermally formed ruthenium oxide electrodes were developed in the 60's and 70's for the chlorine electrode employed in the chloro-alkali industry. One commonly used such electrode is disclosed in U.S. Pat. No. 3,632,498 to Beer, and entitled "ELECTRODE AND COATING THEREFOR." These electrodes were optimized for sodium chloride electrolysis. Generally speaking ruthenium oxide in such an application is a catalytic metal oxide and titanium oxide is a film forming oxide used in conjunction therewith. The Beer Patent claims that the film forming metal is higher than 50 mole percent of the materials of the coating, and specifically that the film forming metal is approximately 70 mole % while the catalytic metal oxide, i.e., $TiO_x$ is approximately 30 mole %.

While these types of electrode materials are known, they have not demonstrated satisfactory capacitance values in electrochemical capacitors. This is due to the fact that the ruthenium oxide content is too low to provide the high power required of most electrical device applications. Simply increasing the ruthenium oxide content in the electrodes does not resolve the problem since reduction of titanium oxide to below approximately 70 mole % will cause poor electrode adherence to the titanium substrates commonly used in such devices. Poor adherence of the electrode active material, results in poor cycle life, shorting, and in general poor device performance.

Accordingly, there exists a need for a dimensionally stable anode employing ruthenium oxide and titanium oxide in a manner sufficient to allow for good material adherence to a titanium substrate, without compromising the electrochemical performance of the ruthenium oxide in the material. Such an electrode should provide a good balance between device performance, costs, and overall process reliability.

DETAILED DESCRIPTION OF THE PREFERRED EMBODIMENT

Figure 1:
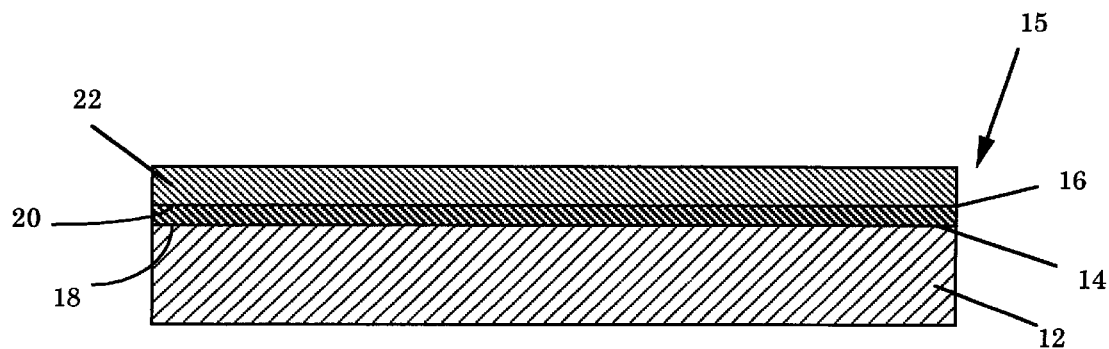
FIG. 1 is a cross-sectional side view of a composite multilayer electrode for use in an electrochemical cell in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross-sectional side view of a composite multilayer electrode for use in an electrochemical cell such as a capacitor. The composite multilayer electrode 10 includes an electrode substrate 12 fabricated of a material selected from the group consisting of titanium, zirconium, tantalum, iron, copper, lead, tin, nickel, zinc, tungsten, aluminum, and combinations thereof. In one preferred embodiment of the instant invention, the substrate is fabricated of titanium, and has the thickness of approximately between 10 µm and 250 µm, and preferably between 25 µm and 125 µm.

The substrate 12 has at least a first surface 14 upon which is deposited the composite multilayer electrode active material. The composite multilayer electrode material comprises at least one layer of electrode active material which electrode active material is fabricated of at least one and preferably more than one oxide selected from the group of ruthenium oxide, titanium oxide, tin oxide, tantalum oxide, iridium oxide, niobium oxide, zirconium oxide, palladium oxide, platinum oxide, vanadium oxide, molybdenum oxide, iron oxide, copper oxide, lead oxide, and combinations thereof. In the embodiment in which the layer of electrode active material is a single layer, the relative proportions of materials in the electrode layer and at the surface closest to the substrate varies from that at the surface farthest from the substrate. For example, in the embodiment in which the electrode active material is fabricated of a combination of ruthenium oxide and titanium oxide, the ratio of titanium to ruthenium at the surface closest to the substrate is different than that at the surface farthest from the substrate. The concentration may be continuously graded from one surface to the other, or alternatively, the electrode active material may be deposited in two separate layers in which the ratio of the materials is different in said layers.

For example, in FIG. 1, the layer of electrode active material 15 actually comprises two discrete layers 16 and 22. Where 16 has first and second surfaces, 18 and 20 respectively. The ratio of titanium to ruthenium in layer 16 is between 65 and 85 mole %, and preferably approximately 75 mole %. Expressed differently, the mole ratio of titanium to ruthenium in layer 16 is approximately 2:1.

Disposed on layer 16 at surface 20 is a second layer of electrode active material. Again, in the embodiment in which titanium oxide and ruthenium oxide is used as the electrode active material, the concentration is different than that in layer 16. For example, on the surface of layer 22 opposite surface 20 of layer 16, the mole ratio of titanium to ruthenium is approximately between 1:1 to 1:2. Expressed differently ruthenium oxide comprises between 35 and 75 mole % in layer 22, and preferably about 50 mole % in layer 22.

Figure 2:
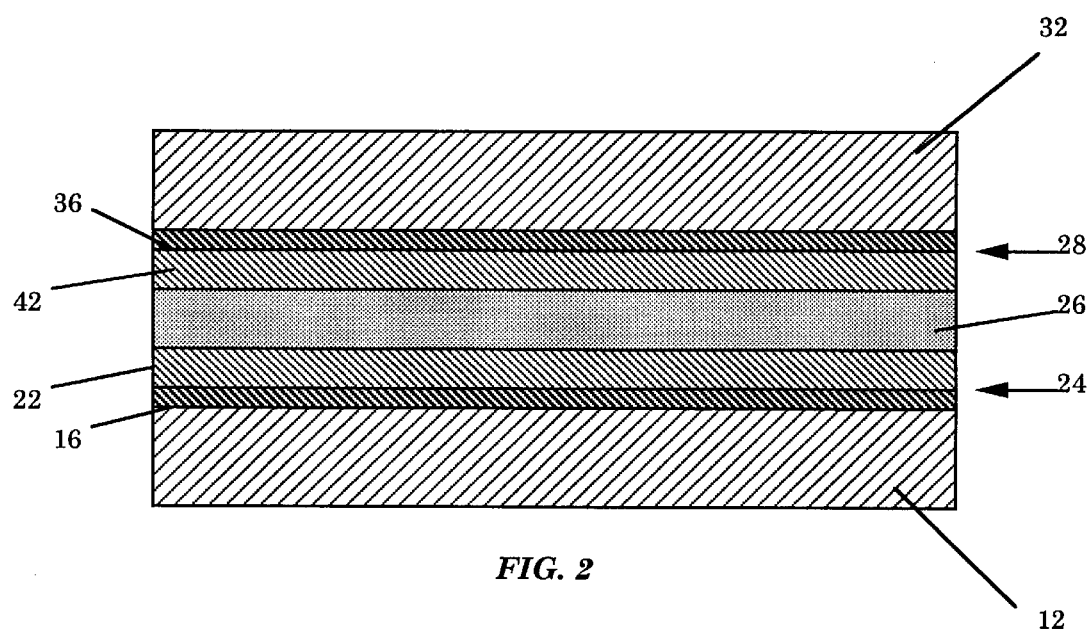
FIG. 2 is a cross sectional side view of an electrochemical capacitor device including a pair of composite multilayered electrodes, in accordance with the instant invention.

Referring now to FIG. 2, there is illustrated an electrochemical cell, particularly an electrochemical capacitor 30 comprising first and second electrode assemblies 24 and 28 with an electrolyte disposed therebetween. Electrode 24 is fabricated substantially identically to that disclosed hereinabove with respect to FIG. 1. Electrode 28 may be identical to the fabrication of that in FIG. 1, or alternatively may be a different material altogether. The electrolyte 26 may be any of the number of known electrolytes in the art, examples of which include, for example, polymeric matrixes such as polyethylene oxide, poly(vinylidene fluoride), poly(vinyl) alcohol, polyacrylonitrile, polyacrylimide, and combinations thereof, which have dispersed therein an electrolyte active species such as, for example, $H_2SO_4$, $H_3PO_4$, KOH, NaOH, and combinations thereof.

In the embodiment of FIG. 2 in which both electrode assemblies 24 and 28 are identical, there are two substrates 12 and 32 fabricated of materials selected from the group described above with respect to substrate 12 in FIG. 1. Disposed on each substrate are first and second layers of electrode active material, first layers 16 and 36 and second layers 22 and 42 respectively. In the embodiment in which the substrates are titanium, the first layers 16 and 36 are fabricated of a blend of ruthenium oxide and titanium oxide, in which the ratio of titanium to ruthenium is approximately 2:1. Expressed differently, the mole % of titanium in layers 16 and 36 is between 65 and 85 mole % and preferably about 75 mole %.

Second layers 22 and 42 may be likewise fabricated from any of a number of oxides selected from the group consisting of ruthenium oxide, titanium oxide, iridium oxide, niobium oxide, zirconium oxide, palladium oxide, platinum oxide, tin oxide, tantalum oxide, vanadium oxide, molybdenum oxide, iron oxide, copper oxide, lead oxide, and combinations thereof. In a preferred embodiment, layers 22 and 42 are fabricated of a combination of ruthenium oxide and titanium oxide. The ratio of ruthenium to titanium in layers 22 and 42 are typically between 1:1 and 2:1 in layers 22 and 42. Expressed differently, ruthenium represents between 35 and 75 mole % of layers 22 and 42.

The invention may be better understood from the examples presented herein below:

EXAMPLES

Example 1

Three coating solutions were prepared as follows:

Solution A:

6.2 cc of 1-butanol (99.8%)

0.5 cc HCL (37%)

2.8 g titanium (IV) butoxide 1 g $RuCl_3.2H_2O$

The materials were then mixed to form a homogeneous solution.

Solution B:

6.2 cc of 1-butanol (99.8%)

0.5 cc HCL (37%)

1.4 g titanium (IV) butoxide 1 g $RuCl_3.2H_2O$

The materials were then mixed to form a homogeneous solution.

Solution C:

6.2 cc of 1-butanol (99.8%)

0.5 cc HCL (37%)

0.7 g titanium (IV) butoxide 1 g $RuCl_3.2H_2O$

The materials were then mixed to form a homogeneous solution.

Solution A described above yields a mole ratio of titanium to ruthenium of approximately 2:1 (75 mole % of titanium). Solution B and Solution C are modified recipes which give mole ratios of 1:1 (50 mole % of titanium) and 1:2 (25 mole % titanium), respectively.

Using the solutions described above, a titanium foil of approximately 25 microns thick was etched in a hot aqueous oxalic acid solution (10 wt.%) for 30 minutes and washed in an ultrasonic water bath and dried. A thin layer of coating of Solution A was painted on to one side of the titanium foil, and heated in air at about 85° C. for between 5 and 10 minutes. The step was repeated by painting another layer on the other side of the titanium foil and again dried for 5–10 minutes at 75° C. Thereafter, the coated titanium foil was heated in air at 400° C. for about ten minutes. The painting, heating, and reheating steps described above were repeated again using Solution A, in order to increase the overall thickness of the first material layer.

Thereafter, the same coating, heating, and reheating procedure was used to coat Solution B atop the first layers already painted onto the titanium substrate. The titanium foil was reheated in air at 400° C. for 10 minutes. Finally, the same coating, heating, and reheating process was used for Solution C.

The composite coating demonstrated excellent adhesion to the titanium foil and excellent capacitance, as is shown in Table 1 hereinbelow.

Four types of ruthenium oxide/titanium oxide was prepared, with mole ratios of Ru/Ti=1/2, 1/1, 2/1, and a composite multilayer electrode as described hereinabove. The capacitance was measured in 5 molar $H_2SO_4$ by cyclic voltammagram, the results of which are illustrated in Table 1. The ratio of ruthenium to titanium equaling about 1:2 (70 mole % titanium oxide) as disclosed in the '498 patent demonstrates capacitance values which are not satisfactory for electrochemical capacitors. While the coating adherence was rated as excellent, the capacitance was only 75 MilliFarads per $cm^2(mF/cm^2)$. Conversely, the electrode with a ratio of ruthenium to titanium of 2:1, 75 mole % ruthenium oxide, had a relatively high capacitance (150 MilliFarads per $cm^2$) and demonstrated poor adherence to the titanium foil. The performance of the electrode in which the ratio of titanium to ruthenium was 1:1 was between that of the first two examples, but was not satisfactory. The material did however, exhibit good adherence to the titanium substrate.

Finally, the electrode prepared in accordance with the present invention and as described hereinabove, demonstrated both high capacitance and excellent adhesion on the coating of the titanium substrate.

| Molar Ratio (Ru/Ti) | Ru Molar Percent (Ru mole %) | Capacitance (mF/cm$^2$) | Coating Adherence |
| --- | --- | --- | --- |
| 1:2 | 33% | 75 | Excellent |
| 1:1 | 50% | 90 | Very Good |
| 2:1 | 66% | 150 | Poor |
| The Present Composite Electrode | 33 to 66% | 200 | Excellent |

Figure 3:
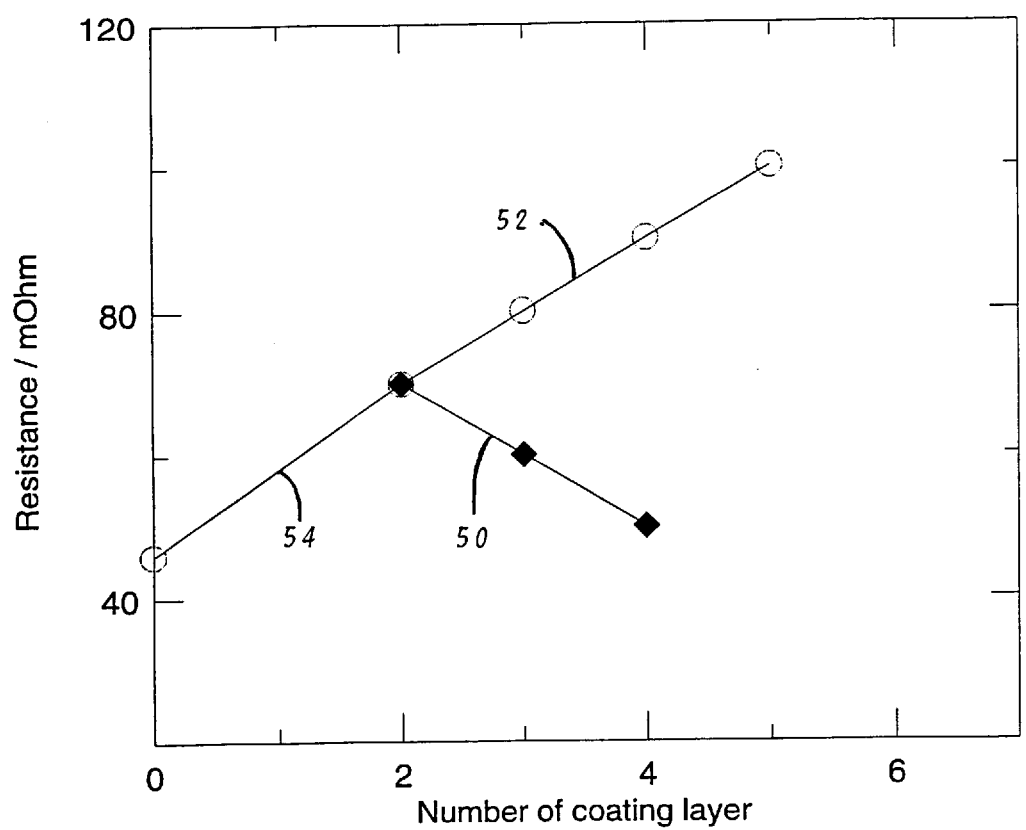
FIG. 3 shows a plot of resistance in milliohm versus coating layers for a prior art device and a device in accordance with the invention.

The electrical resistance of an electrode having a layer of about 70 mole % $TiO_2$ and 30 mole % $RuO_2$ as shown in the '498 patent versus a multilayered structure in accordance with the invention were compared (both use 25 μm' Ti foil as the substrate). The resistance was measured using HP Milliohmmeter with probes placed on the coated oxide surface (all electrodes are 8×3×0.0025 cm). FIG. 3 shows that the resistance of the multilayered electrode (line 50) decreases from the second layer; while the resistance of the prior art electrode (line 52) increases continuously with increasing numbers of coating layers. Since both electrodes have the same two initial layers, the electrode resistance of two electrodes is same for the first coatings as shown by Line 54.

Figure 4:
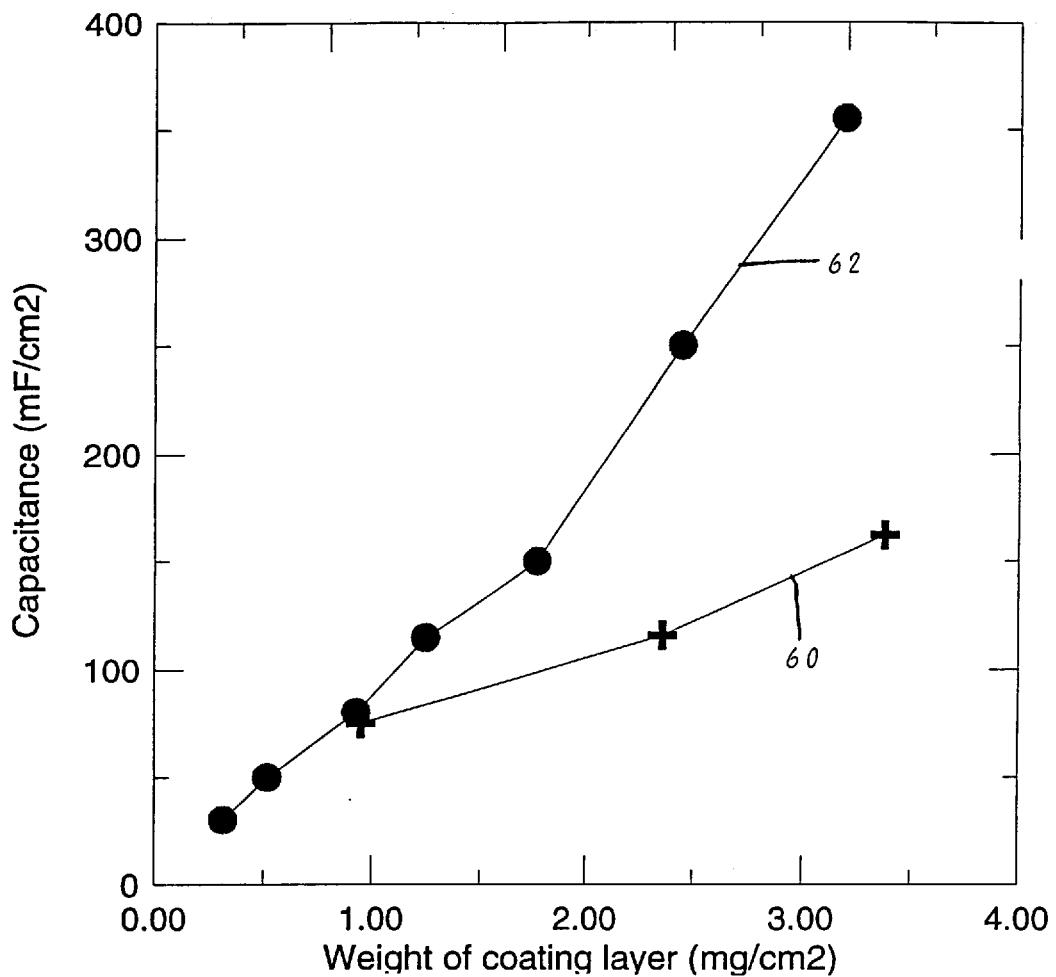
FIG. 4 is a plot of capacitance versus weight in mg/cm$^2$ for a prior art device versus a device in accordance with the instant invention.

FIG. 4 shows electrode capacitance versus weight of coating layers for both electrodes, the prior art electrode illustrated by line 60 and the multilayered electrode in line 62. The capacitance values were measured in 5 M $H_2SO_4$ solution. The multilayered electrode has higher values in mF/mg of coating, especially, in the high capacitance ranges. These are important characteristics of which yield low equivalent series resistance ("ESR"), high capacitance and good frequency response.

Example 2

$RuO_2/SnO_2/TiO_2$ was used in commercial electrodes which had a relatively low capacitance. In a U.S. Pat. No. 3,776,834, 1973, the mole ratio of the $RuO_2/SnO_2/TiO_2$ was about Ru(18)Sn(12)Ti(70). Higher content of Ru and Sn are desired for higher capacitance and electrode conductance. However, simply increasing the Ru and Sn content produces electrodes with poor adhesion of oxide film on Ti substrate. Therefore, a composite Ru-Sn-Ti oxide electrode was developed. Two coating solutions were prepared.

Solution D (18Ru-12Sn-70Ti):
$RuCl_3.2H_2O$ 1.2 g
$SnCl_2$(anhydrous) 0.6 g
Ti(V) butoxide 5.7 g
HCl (36%) 0.7 ml
Butanol (99.9%) 11 ml
Solution E (35Ru-25Sn-40Ti):
$RuCl_3.2H_2O$ 1.0 g
$SnCl_2$(anhydrous) 0.56 g
Ti(V) butoxide 1.6 g
HCl (36%) 0.6 ml
Butanol (99.9%) 9.4 ml Solution D gives an oxide coating with a mole ratio of 18Ru-12Sn-70Ti. Solution E yields an oxide coating with mole ratio of 35Ru-25Sn-40Ti.

The composite Ru-Sn-Ti electrodes were prepared by the following procedure. Using solutions D&E, described above, a titanium foil of approximately 25 microns thick was etched in a hot aqueous oxalic acid solution (10 wt. %) for 30 minutes and washed in an ultrasonic water bath and dried. A thin layer of coating of solution D was painted on to one side of the titanium foil, and heated in air at 75°–90° C. for between 5 and 10 minutes. The step was repeated by painting another layer on the other side of the titanium foil and again dried for 5–10 minutes at 75°–90° C. Thereafter, the coated titanium foil was heated in air at 400° C. for 6–10 minutes.

Thereafter, the same coating, heating, and reheating procedure was used to coat Solution E atop the first layers already painted onto the titanium substrate. The number of coating layers using Solution E depends on the desired capacitance and frequency response. Finally, for the top most layer, the same coating, heating, and reheating process was used for Solution E, however, using a 10–20 minute reheat at 400° C.

Figure 5:
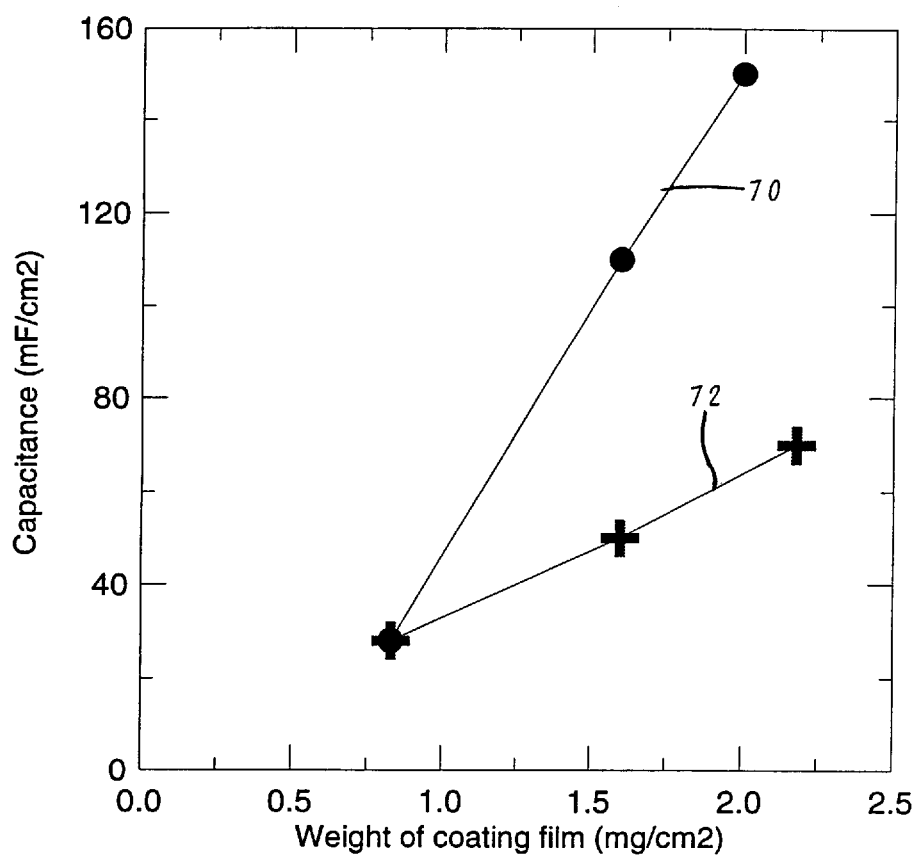
FIG. 5 is a plot of capacitance versus weight for two different devices in accordance with the invention.

The composite coating demonstrated excellent adhesion to the titanium foil and excellent capacitance, as is shown in FIG. 5. The capacitance values were measured in 5M $H_2SO_4$ solution. The composite electrode (line 70) had higher capacitance and better performance than the single layer device electrode (line 72). The values of capacitance per mg of oxide loading are about 32 and 70 mF/mg, respectively.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical capacitor with symmetric composite electrodes comprising:

at least a first and a second electrode and an electrolyte disposed between said electrodes, at least one of said electrodes comprising a substrate fabricated of a material selected from the group of Ti, Zr, Ta, Fe, Cu, Pb, Sn, Ni, Zn, W, Al, and combinations thereof, and being disposed thereon a layer of electrode active material having a first surface adjacent said substrate and a second surface, said layer of electrode active materials being fabricated of two materials selected from the group consisting of Ru oxide, Ti oxide, Ir oxide, Nb oxide, Zr oxide, Pd oxide, Pt oxide, tin oxide, tantalum oxide, vanadium oxide, molybdenum oxide, iron oxide, copper oxide, lead oxide, and combinations thereof, and wherein the ratios of said two materials at said first surface are different than the ratio at said second surface.

2. An electrochemical capacitor as in claim 1, wherein said layer of electrode active material is fabricated of Ru oxide and Ti oxide.

3. An electrochemical capacitor as in claim 2, further including Sn oxide.

4. An electrochemical capacitor as in claim 2, wherein the ratio of Ti to Ru at the surface adjacent said substrate is 2:1.

5. An electrochemical capacitor as in claim 2, wherein the ratio of Ti to Ru at the second surface is between 1:1 and 1:2.

6. An electrochemical capacitor as in claim 1, wherein said substrate is made of Ti.

7. An electrochemical capacitor as in claim 1, wherein said electrolyte comprises a polymeric carrier having an electrolyte active species dispersed therein.

* * * * *